United States Patent
Reyes Lozano et al.

(10) Patent No.: US 9,280,322 B2
(45) Date of Patent: Mar. 8, 2016

(54) GENERATING SOURCE CODE

(71) Applicant: Intel Corporation, Santa Clara, CA (US)

(72) Inventors: Leo Reyes Lozano, Guadalajara (MX); Alejandro Ibarra Von Borstel, Tlaquepaque (MX)

(73) Assignee: INTEL CORPORATION, Santa Clara, CA (US)

(*) Notice: Subject to any disclaimer, the term of this patent is extended or adjusted under 35 U.S.C. 154(b) by 170 days.

(21) Appl. No.: 13/628,528

(22) Filed: Sep. 27, 2012

(65) Prior Publication Data

US 2014/0089891 A1 Mar. 27, 2014

(51) Int. Cl.
*G06F 9/44* (2006.01)
*G06F 9/45* (2006.01)

(52) U.S. Cl.
CPC .. *G06F 8/30* (2013.01); *G06F 8/77* (2013.01); *G06F 8/52* (2013.01)

(58) Field of Classification Search
None
See application file for complete search history.

(56) References Cited

U.S. PATENT DOCUMENTS

| | | | | |
|---|---|---|---|---|
| 5,488,714 A * | 1/1996 | Skidmore | ................ | G06F 8/52 706/45 |
| 5,640,576 A * | 6/1997 | Kobayashi et al. | ................ | 704/9 |
| 6,031,993 A * | 2/2000 | Andrews et al. | ............... | 717/143 |
| 6,810,392 B1 * | 10/2004 | Piggott | ........................... | 706/12 |
| 7,137,100 B2 * | 11/2006 | Iborra et al. | .................. | 717/106 |
| 7,437,719 B2 * | 10/2008 | Nagaraj et al. | ................. | 717/136 |
| 7,765,097 B1 * | 7/2010 | Yu et al. | ............................. | 704/9 |
| 8,181,170 B2 * | 5/2012 | Patil | .......................... | G06F 8/52 |
| 8,365,138 B2 * | 1/2013 | Iborra | ....................... | G06F 8/30 717/151 |
| 8,423,986 B1 * | 4/2013 | Grechanik | .................... | 717/154 717/104 |
| 8,762,947 B2 * | 6/2014 | Lee et al. | ...................... | 717/124 |
| 8,819,652 B2 * | 8/2014 | Zingelewicz et al. | ......... | 717/151 |
| 2003/0004979 A1 * | 1/2003 | Woodring | ................ | G06F 8/30 |
| 2004/0111695 A1 * | 6/2004 | Kato | .............. | 717/100 |
| 2005/0071825 A1 * | 3/2005 | Nagaraj et al. | ................ | 717/142 |
| 2005/0076332 A1 * | 4/2005 | Jawaharlal | ................ | G06F 8/30 717/140 |
| 2005/0120276 A1 * | 6/2005 | Kolawa et al. | ................... | 714/38 |
| 2006/0136880 A1 * | 6/2006 | Sone et al. | ..................... | 717/136 |
| 2006/0294500 A1 * | 12/2006 | Chiang | .................... | G06F 8/30 717/109 |
| 2008/0005728 A1 * | 1/2008 | Morris | ......................... | 717/153 |
| 2008/0120602 A1 * | 5/2008 | Comstock et al. | ............ | 717/125 |
| 2008/0189688 A1 * | 8/2008 | Schmidt | ....................... | 717/128 |

(Continued)

OTHER PUBLICATIONS

Bajwa et al., "Object Oriented Software Modeling Using NLP Based Knowledge Extraction," 2009, European Journal of Scientific Research, ISSN 1450-216X vol. 35 No. 1 (2009), pp. 22-33.*

(Continued)

*Primary Examiner* — Thuy Dao
*Assistant Examiner* — Stephen Berman
(74) *Attorney, Agent, or Firm* — International IP Law Group, P.L.L.C.

(57) ABSTRACT

Techniques for generating source code are included herein in which a set of semantic rules for the source code may be received. Also, a set of initialization values may be received, wherein the set of initialization values comprises a set of input values and a set of output values. Furthermore, a weighted data structure may be generated. In addition, the source code may be generated based on the weighted data structure and the set of semantic rules. The source code can also be determined to have an accuracy above a threshold based at least in part on the set of initialization values and an output value from the source code. Additionally, the source code can be returned based on the set of initialization values.

22 Claims, 5 Drawing Sheets

(56) References Cited

U.S. PATENT DOCUMENTS

| | | | | |
|---|---|---|---|---|
| 2011/0067009 | A1* | 3/2011 | Hosokawa | G06F 8/77 717/132 |
| 2011/0246969 | A1* | 10/2011 | Lee et al. | 717/125 |
| 2011/0276944 | A1* | 11/2011 | Bergman et al. | 717/124 |
| 2012/0233165 | A1* | 9/2012 | Kirkpatrick | G06F 8/77 707/737 |
| 2012/0317553 | A1* | 12/2012 | Schmidt | 717/130 |
| 2014/0013299 | A1* | 1/2014 | Bordeaux et al. | 717/106 |

OTHER PUBLICATIONS

Deeptimahanti et al., "An Automated Tool for Generating UML Models from Natural Language Requirements ," 2009, 24th IEEE/ACM International Conference on Automated Software Engineering, pp. 680-682.*

Bao et al., "Test Case Generation Using Model Checking for Software Components Deployed into New Environments," 2009, Proceedings of the IEEE International Conference on Software Testing, Verification, and Validation Workshops, pp. 57-66.*

Budinsky et al., "Automatic code generation from design patterns," 1996, IBM Systems Journal, vol. 35, Issue: 2, pp. 151-171.*

Moreira et al., "Automatic code generation for embedded systems: From UML specifications to VHDL code," 2010, 8th IEEE International Conference on Industrial Informatics (INDIN), pp. 1085-1090.*

Subramanian et al., "Automatic verification of object code against source code," 1996, IEEE, COMPASS '96, Proceedings of the Eleventh Annual Conference on Computer Assurance, pp. 46-55.*

Poulter, Graham, "Code generation vs metaprogramming", Dec. 23, 2008. available at: http://blog.grahampoulter.com/2008/12/code-generation-vs-metaprogramming-in.html#l/2008/12/code-generation-vs-metaprogramming-in.html.

"36 Human-Competitive Results Produced by Genetic Programming", retrieved on Oct. 8, 2012, 4 pages, available at: http://www.geneticprogramming.com/humancompetitive.html.

"A Source of Information About the Field of Genetic Programming and the Field of Genetic and Evolutionary Computation", Jul. 8, 2007, 10 pages, available at: http://www.genetic-programming.org/.

"Automatic programming", Wikipedia, the free encyclopedia, retrieved on Oct. 8, 2012, 4 pages, available at: http://en.wikipedia.org/wiki/Automatic_programming#Generative_programming.

"Genetic programming", From Wikipedia, the free encyclopedia, retrieved on Oct. 8, 2012, 10 pages available at: http://en.wikipedia.org/wiki/Genetic_programming.

"Metaprogramming", From Wikipedia, the free encyclopedia, retrieved on Oct. 8, 2012, 4 pages, available at: http://en.wikipedia.org/wiki/Metaprogramming.

"The GP Tutorial", retrieved on Oct. 8, 2012, 7 pages, available at: http://www.geneticprogram ming .com/Tutorial/.

Jurafsky, et al., "Introduction to N-grams—Stanford NLP", published on Apr. 2, 2012, by OpenCourseOnline, available at: http://www.youtube.com/watch?v=s3kKIU Ba3bO&featu re=relmfu.

Jurafsky, et al., "Course Introduction—Stanford NLP", published on Mar. 31, 2012 by OpenCourseOnline, available at: http://www.youtube.com/watch?v=nfoudtpBV68.

Jurafsky, et al., "Natural Language Processing", retrieved on Oct. 8, 2012, 4 pages, available at: https://www.coursera.org/course/nlp.

Khoury, Menu, "Module tutorial1", Version: 1.20, 2009, 3 pages, available at: http://pystep.sourceforge.net/tutorial1-module.html.

Khoury, Menu, "Python Strongly Typed gEnetic Programming", 2009, 5 pages, available at: http://pystep.sourceforge.net/.

Manning, Christopher D., "Artificial Intelligence I Natural Language Processing", retrieved on Oct. 8, 2012, 4 pages, previously available at: http://see.stanford.edu/see/lecturelist.aspx?coll=63480b48-8819-4efd-8412-263f1a472f5a.

Opencog, "Meta-Optimizing Semantic Evolutionary Search", retrieved on Oct. 8, 2012, 3 pages, available at: http://wiki.opencog.org/w/Meta-Optimizing_Semantic_Evolutionary_Search.

* cited by examiner

GENERATING SOURCE CODE

BACKGROUND

1. Field

This disclosure relates generally to generating data with a computing system and more specifically, but not exclusively, to generating source code with a computing system.

2. Description

Software development can be a time consuming process. To reduce the time to develop software, various methods for automating the generation of source code have been developed. For example, some methods use genetic programming for generating source code. However, the genetic programming techniques use a variety of parameters, which are adjusted based on particular problems in order to generate source code.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
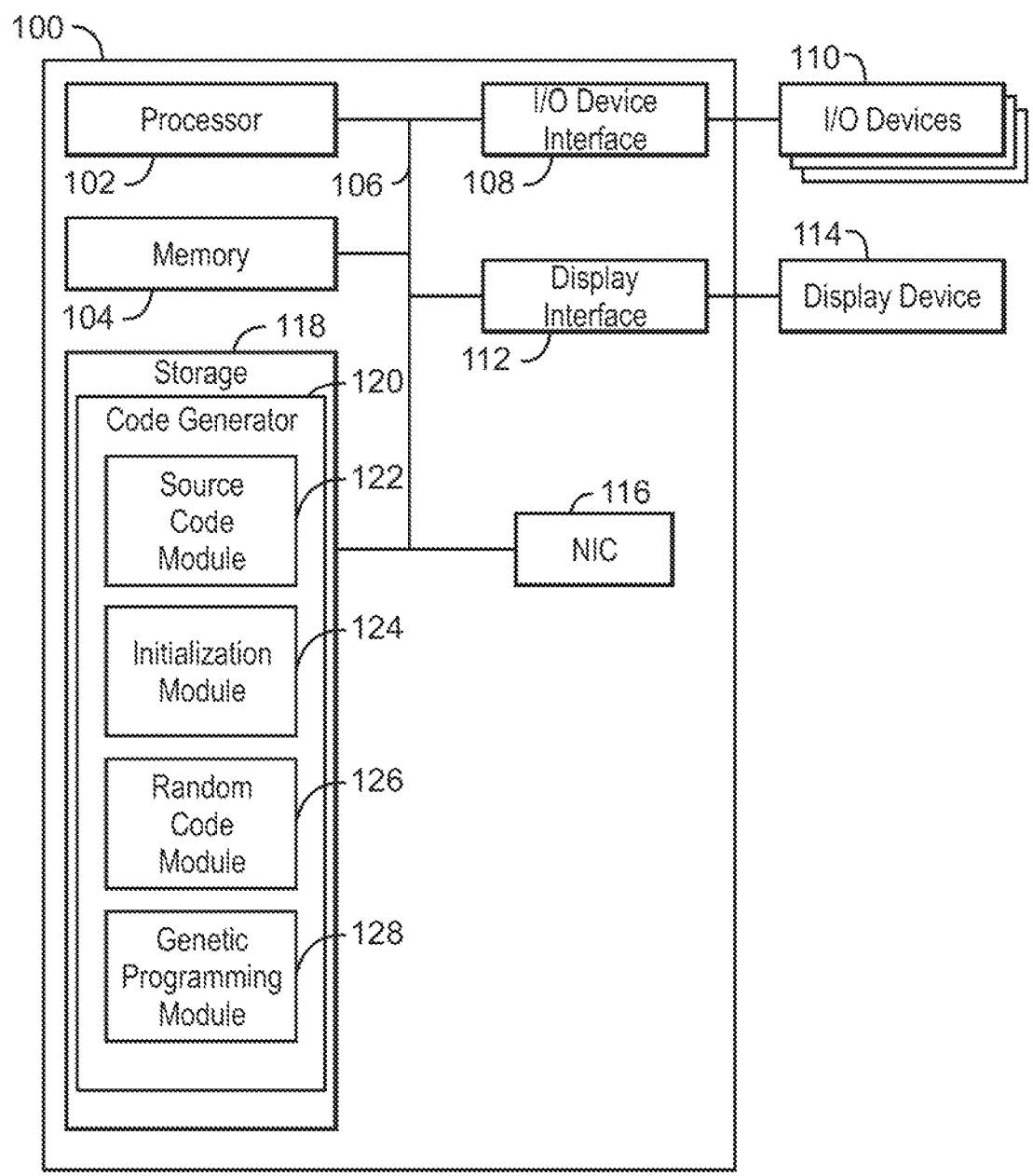
FIG. 1 is a block diagram of an example of a computing system that can generate source code.

According to embodiments of the subject matter disclosed herein, source code can be generated automatically using a weighted data structure and a set of initialization values. As used herein, the term "automatically" refers to an automated process executed by a processor, in other words, without human labor. The weighted data structure can include any suitable data structure that can store a weight value for any number of entries. For example, the weighted data structure may be represented with a vector, a linked list, a weighted graph, an N-gram, a Markov chain, or a weighted syntax tree, among others. The set of initialization values can include any suitable number of input values and output values. For example, the set of initialization values may include an input value that is provided to source code and the set of initialization values may also include an output value that is to be produced by the source code in response to the input value.

In some embodiments, the entries stored in a weighted data structure can represent variables, operators, control structures, or function calls. The weights stored for each entry can indicate which entries are most likely to be used in the generated source code. For example, a particular operator may have a greater likelihood of generating an output value that corresponds with an initialization value. In some embodiments, the weights themselves may also be functions. For example, the weights may be functions that can be modified based on the average number of lines of previous source code samples, the location of a code segment within the generated source code, the location of a code segment within a conditional statement, any output values, performance values, code length, or any other suitable metrics.

In some embodiments, natural language processing (also referred to herein as NLP) can be used to generate source code. In NLP, N-grams can be generated by analyzing text. An N-gram can represent a contiguous sequence of items derived from any suitable sequence, such as text or speech, among others. The N-grams can indicate the likelihood that a particular word or phrase will appear by analyzing the N number of previous words or phrases. For example, an N-Gram that includes code fragments may indicate a particular likelihood that a conditional expression is to follow an "if" construct. A code fragment can include any suitable number of functions or lines of source code, among others. Furthermore, an N-Gram may predict which variables are more likely to appear in a conditional statement. Additionally, NLP can also serve as a heuristic to guide the random generation of source code.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a computing system that can generate source code. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to implement a method that includes generating source code.

The processor 102 may be connected through a system interconnect 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system interconnect 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. In addition, a network interface card (NIC) 116 may be adapted to connect the computing system 100 through the system interconnect 106 to a network (not depicted). The network (not depicted) may be a wide area network (WAN), local area network (LAN), or the Internet, among others.

The storage device 118 can include a hard drive, an optical drive, a USB flash drive, an array of drives, or any combinations thereof. The storage device 118 may include a code generator 120 that can include a source code module 122, an initialization module 124, a random code module 126, and a genetic programming module 128. The initialization module 124 can receive current initialization values and compare the current initialization values with previous initialization values. In some examples, the initialization values can include input values and output values. The output values are values that can be expected from source code in response to the input values. The source code module 122 can generate a weighted data structure based on samples of source code and a set of semantic rules. The source code module 122 can receive the semantic rules from an input device or an application, among others. The set of semantic rules can indicate the formatting for text strings that are included in the source code. The weighted data structure can include any number of operators and parameters. The weighted data structure can also include the frequency that the operators and parameters are used in source code. For example, the weighted data structure may be represented with a weighted syntax tree. The weighted syntax tree may include any suitable number of operators and the number of parameters for each operator. In some embodiments, each weighted data structure may represent the operators for a particular programming language. In other embodiments, a weighted data structure may include operators from multiple programming languages. Further, the weighted data structure may contain weights which are themselves functions so that the weights may change according to the context, the semantic rules, the code that has been generated so far, or other inputs to the system. The random code generator 126 may then generate source code based on the weighted data structure. For example, the random code generator 126 may use the weights from the weighted data structure to select the most frequently used operators. The random code generator 126 may also receive the current initialization values from the initialization module 124 and receive the output of the generated source code. The random code generator 126 may detect whether the output of the generated source code is correct based on the current initialization values. The genetic programming module 128 may also detect weights from the weighted data structure and use any suitable genetic programming technique to generate source code.

In some embodiments, the code generator 120 generates source code with any suitable combination of the random code module 126 and the genetic programming module 128. For example, the random code module 126 may use the weighted data structure to generate a code fragment, which can be transformed into a possible solution to a problem (also referred to herein as a genome). The genome can be used by the genetic programming module 128 to further refine the source code. In some examples, the genetic programming module 128 may combine code fragments and produce offspring. The offspring can be transformed into a set of weighted data structures, which can be used by the random code module 126 in subsequent iterations. In some embodiments, the random code module 126 and the genetic programming module 128 can communicate data related to weighted data structures, which allows the source code to be modified by both the random code module 126 and the genetic programming module 128. For example, multiple random code modules 126 may generate various code fragments, which can be combined in the genetic programming module 128 to generate offspring to accelerate convergence.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional memory components, additional modules, additional network interfaces, etc.). Furthermore, any of the functionalities of the code generator 120 may be partially, or entirely, implemented in hardware and/or in the processor 102. For example, the functionality may be implemented with an application specific integrated circuit, or in logic implemented in the processor 102, among others.

Figure 2:
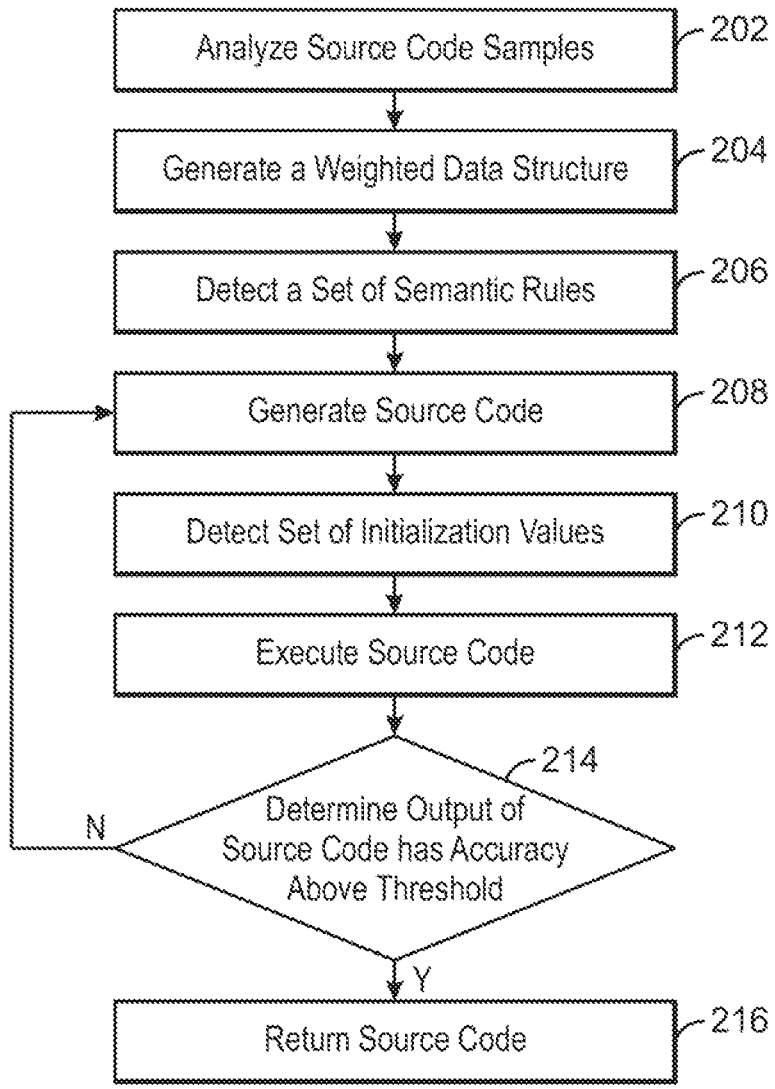
FIG. 2 is a process flow diagram illustrating an example of a method that can generate source code.

FIG. 2 is a process flow diagram illustrating an example of a method that can generate source code. The method 200 can be implemented with a computing system, such as the computing system 100 of FIG. 1.

At block 202, the source code module 122 can analyze source code samples to generate weights for a weighted data structure. In some embodiments, the source code samples may include any suitable number of source code samples in any number of programming languages. In some examples, the source code samples may include code fragments that solve any number of problems. In some examples, the code fragments may not be related to solving the same problem. For example, a first source code segment may compute the summation of various variables, while a second code fragment may compute the difference between two variables. The source code module 122 can identify the operators used in each code fragment to determine the most likely operators to be used in the generated source code, which can be achieved by comparing the inputs and outputs of the current problem with the inputs and outputs of each code fragment. The code fragments which are deemed similar after this filtering process are selected and combined by any suitable technique to generate a weighted data structure. For example, if a set of input and output values involve the addition of two variables, code fragments involving summation are more likely to be selected for analysis to build the weighted data structure while code fragments involving subtraction may not be included in the weighted data structure.

At block 204, the source code module 122 can generate a weighted data structure. As discussed above, the weighted data structure can include any suitable data structure that can store weights for any number of entries. In some embodiments, the entries can include any number of operators and parameters. For example, an addition operator may compute a sum of two parameters. In some embodiments, the weights stored in the weighted data structure can indicate the likelihood of source code using a particular operator given the current context. For example, a division operator may be used a particular number of times in previous source code samples. In some embodiments, the source code module 122 can compute the likelihood that the operator will be used in generated source code based on the number of times the operator is included in previous source code samples.

At block 206, a set of semantic rules is received. In some embodiments, the set of semantic rules can include programming language syntax rules that indicate how to structure text strings that represent the source code. For example, a programming language may use a particular format for each operation. The set of semantic rules can include a set of formatting rules that indicate how to structure a text string for each operation of a programming language. In one example, the set of semantic rules may include formatting rules that indicate how to designate a local variable and a global variable. The set of semantic rules may also express restrictions on how to generate the source code. For example, a conditional statement may be restricted to include certain terms such as "if" or "while," among others. In some examples, the set of semantic rules may also include restrictions on variable usage, such as designating some variables as "read-only," or restrictions on how to generate code, such as not writing to null pointers or not reading from un-initialized variables, among others. In other examples, the set of semantic rules may also indicate a preference to use certain operations. For example, the set of semantic rules may indicate a preference to use an operation with a faster execution speed rather than an operation with a slower execution speed. In some embodiments, the set of semantic rules can prevent the generation of nonsensical source code. For example, the set of semantic rules can ensure Boolean values are generated from segments of the source code containing conditions, or integer values are assigned to integer variables, and the like. The set of semantic rules can also include first-order logic statements that can indicate sequences that are to occur in the source code. In some embodiments, it is also possible to generate some of these semantic rules by performing a semantic NLP analysis on fragments of source code or a subset of the input values.

At block 208, the source code is generated. In some embodiments, the random code module 126 can generate the source code. The random code module 126 may generate source code by randomly selecting operators from the weighted data structure based on the weights assigned to each operator. For example, a particular operator stored in the weighted data structure may have a greater likelihood of selection than other operators stored in the weighted data structure. In some examples, the set of semantic rules may be used to generate the text strings in the source code. For example, the generated source code may include text strings for the selected operator based on the set of semantic rules. If the generated source code does not comply with the set of semantic rules, the generated source code can be rejected without execution of the source code. For example, the random code generator 126 may determine that a read only variable in the source code is on the left hand side of an assignment. In some examples, the random code generator 126 can replace a portion of the source code that does not comply with the set of semantic rules with generated source code that does comply with the set of semantic rules.

In some embodiments, the genetic programming module 128 can generate the source code. The genetic programming module 128 can use any number of genetic programming algorithms, such as an evolutionary programming algorithm or a swarm algorithm, among others. In some examples, the genetic programming module 128 can detect genetic algorithm parameters that can include a crossover rate or mutation rate, among others. The genetic algorithm parameters can indicate to the genetic programming module 128 how to generate source code. In some embodiments, the genetic algorithm parameters may be default values or values stored with each sample of source code. In some examples, the genetic programming module 128 may identify source code samples to combine to generate source code. The genetic programming module 128 may also combine the genetic algorithm parameters for the identified source code samples. In some embodiments, the genetic programming module 128 can detect an initial population, such as lines of source code, from the random code module 126. In some examples, the genetic programming module 128 can then perform operations, such as mutation and crossover, on the initial population.

At block 210, the initialization module 124 can receive a set of initialization values. As discussed above, the set of initialization values can include any suitable number of input values and output values. In some embodiments, the input values may indicate values that are provided to the source code and the output values may indicate values that are to be produced by the source code in response to the input values. For example, a set of initialization values may include an input value and an output value. In this example, the input value may include a numerical value, such as 3, and the output value corresponding to the input value may include a numerical value, such as 9. In this example, the source code detects a value of 3 and the source code is to produce a value of 9. In some embodiments, the input values may correspond with any value in a set of output values. For example, the input values may not have a particular expected output value. Rather, each input value may have one of many output values that is included in the set of output values.

At block 212, the source code module 122 can execute the source code. In some embodiments, the source code can produce an output value or a set of output values in response to input values from the set of initialization values. In some embodiments, a timeout value can be used to ensure the execution of the source code is terminated after a period of time. For example, the source code may include an infinite loop or a null-pointer assignment, among others, that can prevent the execution of the source code. A timeout value can indicate that the source code has not terminated after a period of time and execution of the source code can be stopped. In some embodiments, the timeout can be specified by the user or it may be updated dynamically by statistical means.

At block 214, the source code module 122 determines if the output values provided by the source code have an accuracy above a threshold. For example, the accuracy of generated source code may be determined by the number of output values produced that correspond with the expected output values provided in the set of initialization values. For example, the set of initialization values may provide three input values and three corresponding output values. The generated source code may produce any number of expected output values. In some examples, the accuracy of the generated source code may be based on the number of output values from the generated source code that belong to the set of initialization values. For example, the generated source code may produce three output values, wherein two of the three output values are included in the set of initialization values. The accuracy may be identified based on a percentage, a decimal value, among others. For example, the accuracy of the generated source code may be represented as 67%, 0.667, or the like.

In some embodiments, the accuracy of the generated source code may be measured by a cost function. The cost function may use a combination of output values, performance values, code length and other suitable metrics to determine a statistical value that indicates the accuracy of the generated source code. For example, a cost function may measure the execution time of the generated source code that produces the expected output values or determine the total number of lines of the generated source code that produces the expected output values. In some embodiments, the cost function may compare certain aspects of the output from the source code. For example, a cost function may determine the accuracy of source code that produces an image as output by analyzing certain features of the image. In other examples, a cost function may also determine the accuracy of source code that performs audio processing by measuring the signal-to-noise ratio present in the output. In other examples, the code generated may be in a hardware-definition language and the output may consist of comparing the signals generated by the code against an expected pattern, and the like in other examples, a cost function may also determine the accuracy of generated source code based on the energy consumption of a computing device that executes the generated source code or a thermal measurement of a computing device that executes the generated source code. If the accuracy of the generated source code is not above a threshold, the process flow returns to block 208. If the accuracy of the generated source code is above a threshold, the process flow continues at block 216.

At block 216, the generated source code can be returned as a function or a code fragment based on the set of initialization values. For example, the generated source code may represent a function that can accept input values and generate output values that are included in the set of initialization values. In some examples, the generated source code may represent any suitable number of functions that can produce accurate output values. In some embodiments, the generated source code may be a sequence of statements or a set of sequences which can be used to fill pre-defined code templates. For example, the generated source code may solve a problem by modifying a source code template for a particular algorithm.

The process flow diagram of FIG. 2 is not intended to indicate that the operations of the method 200 are to be executed in any particular order, or that all of the operations of the method 200 are to be included in every case. For example, the source code module 122 may not receive source code samples. If source code samples are not received, the weighted data structure may begin with an equal weight for each entry. Further, any number of additional operations may be included within the method 200, depending on the specific application. For example, the method 200 may also modify the weights stored in the weighted data structure based on the output values detected at block 216.

Figure 3:
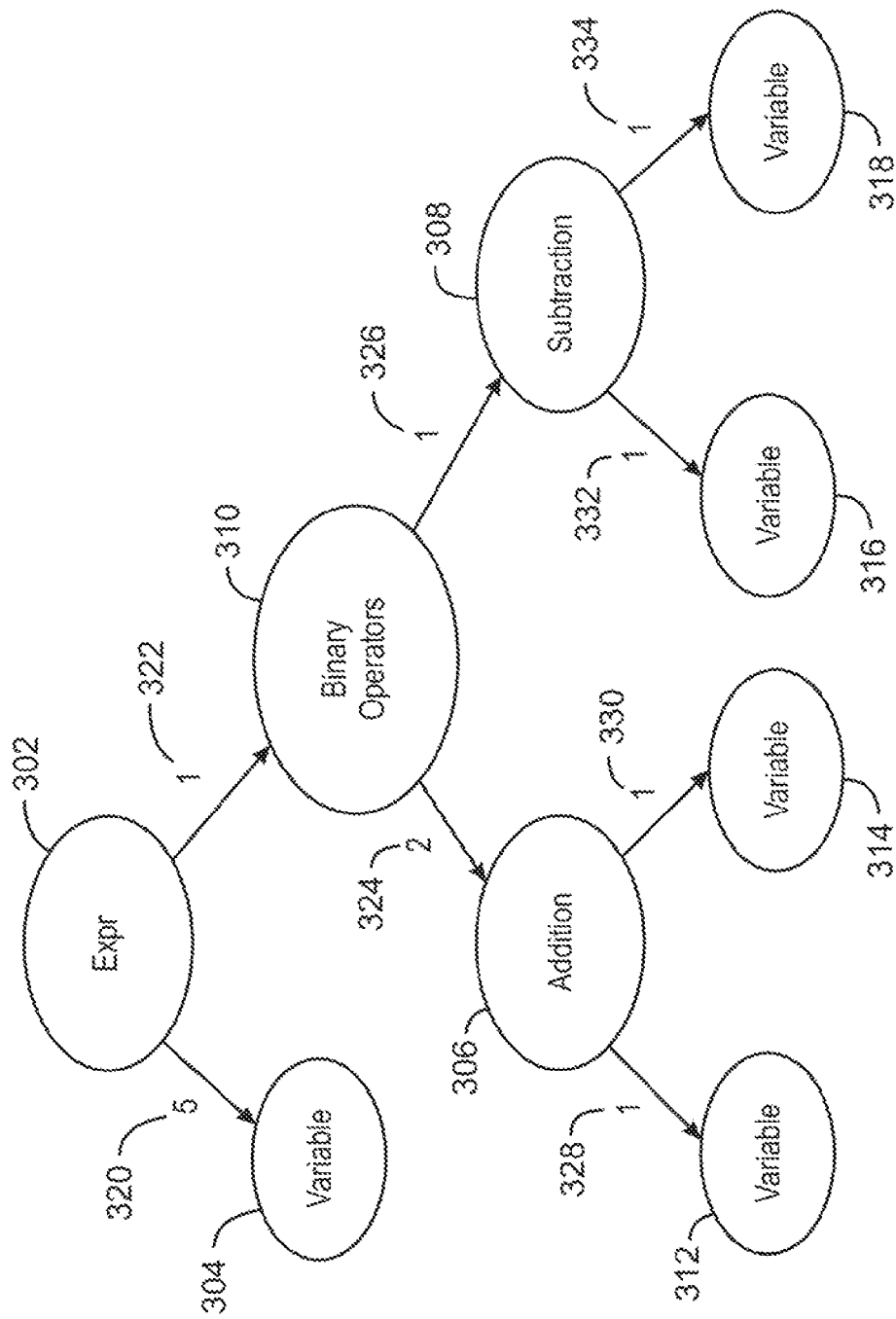
FIG. 3 is an example of a weighted syntax tree that can be used to generate source code.

FIG. 3 is an example of a weighted syntax tree that can be used to generate source code. As discussed above, a weighted syntax tree 300 is one of many data structures that can be used to generate source code. In some embodiments, the weighted syntax tree 300 can be generated and maintained by the source code module 122.

In some embodiments, the weighted syntax tree 300 may include an expression 302, which may include any number of variables 304 or any number of operators 306 and 308 or other programming constructs such as control statements and function calls. In some examples, the operators 306 and 308 can be grouped together. For example, the binary operator group 310 may include any suitable number of binary operators, such as an addition operator 306 and a subtraction operator 308, among others. Each of the binary operators, such as the addition operator 306 and the subtraction operation 308 may have any suitable number of parameters. For example, the addition operator 306 may include two parameters such as variable 312 and variable 314. Similarly the subtraction operator 308 may also include two parameters such as variable 316 and variable 318. In some examples, a subtraction operation may be performed on more than two variables. For example, an addition operator may accept five variables and may compute a summation of the five variables. In some embodiments, the weighted syntax tree 300 may also include a sequential operator that allows lines of source code to be generated based on the location of the lines of source code within the generated source code. For example, the sequential operator may be based on the average length of previous source code samples or portions of previous source code samples. In some examples, the sequential operator may detect that the generated source code is approaching the average length of previous source code samples. The sequential operator may also indicate that the generated source code has reached a desired number of lines of source code. In some embodiments, the sequential operator may indicate that additional lines of source code are not to be included in the generated source code. In other examples, the sequential operator may indicate that a conditional statement has reached a desired length. For example, the sequential operator may indicate that a conditional statement has an average length of some number of lines of code in previous source code samples. The sequential operator may also indicate that a conditional statement has reached the average length of lines of source code.

In some embodiments, the weighted syntax tree 300 can indicate a weight 320, 322, 324, 326, 328, 330, 332, and 334 for each operator 306 and 308, or each variable 304, 312, 314, 316, and 318. The weights 320, 322, 324, 326, 328, 330, 332, and 334 may be based on the number of times the operator 306 and 308 or the variables 304, 312, 314, 316, and 318 are used in previous source code samples. For example, variable 304 may be referenced a certain number of times in previous source code samples. In some embodiments, the weights are not static but dynamic and can change depending on the context. In some examples, the weights become functions of the current state of the code generator, the input data and the semantic rules. The weight 320 in the weighted syntax tree 300 can reflect the likelihood that the generated source code will include the variable 304. For example, the weight 304 indicates that the variable 304 is five times as likely as a binary operator from the binary operator group 310 to be included in the generated source code. In some embodiments, the weights are set to an equal value when previous source code samples are unavailable. In some examples, the weights 320, 322, 324, 326, 328, 330, 332, and 334 can be adjusted after source code is generated and the source code is evaluated for accuracy. In some embodiments, the weights can be implemented as N-Grams or Markov chains or any other suitable constructs used in natural language processing techniques to predict the likelihood of a new word or programming construct appearing in a particular location within the source code.

Figure 4:
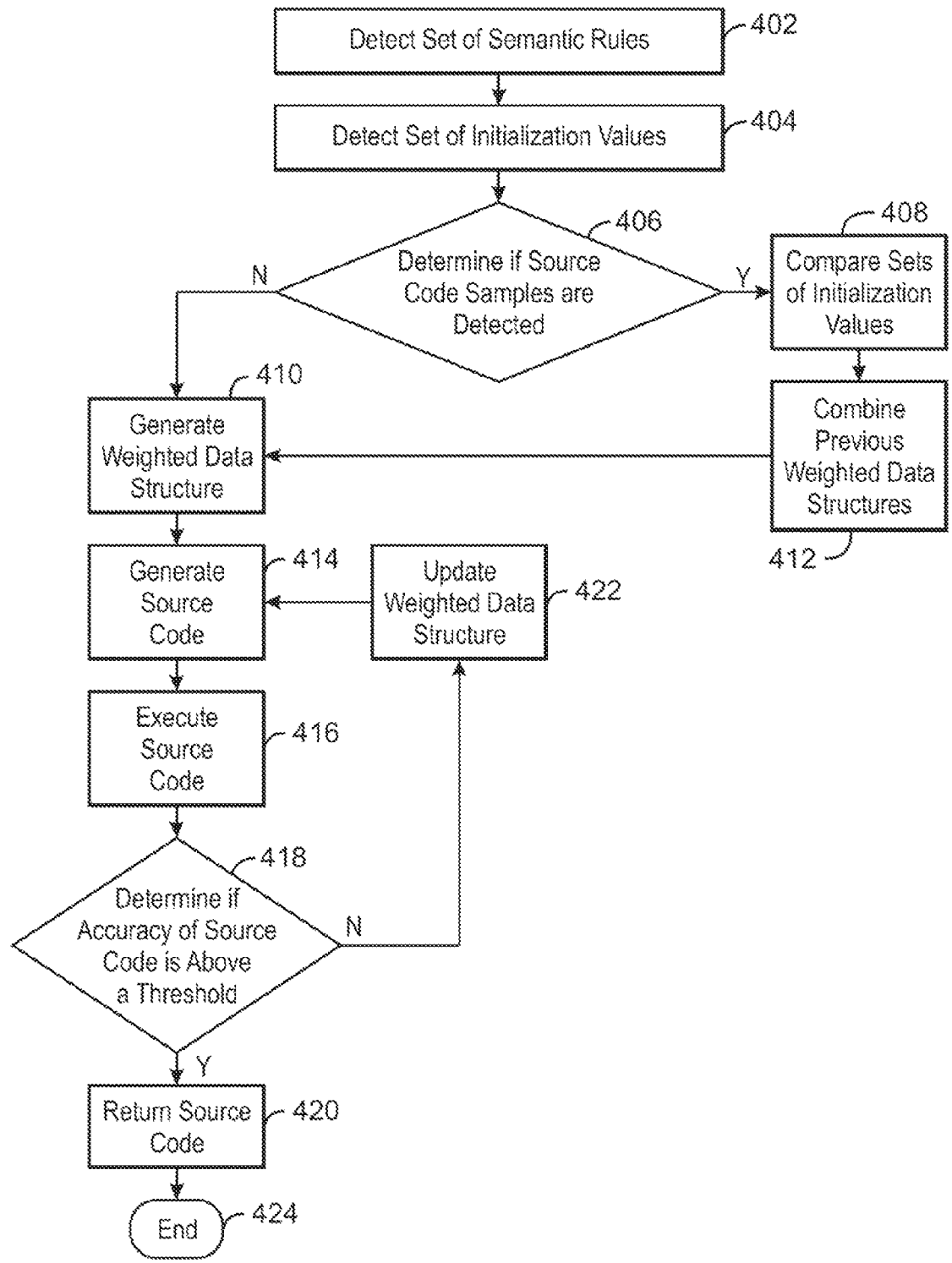
FIG. 4 is a process flow diagram illustrating an example of a method for generating source code.

FIG. 4 is a flow chart illustrating an example of a method for generating source code. The method 400 can be implemented in a computing system, such as the computing system 100 of FIG. 1. In some embodiments, the method 400 can be implemented with a computing system 100 that generates source code using a random code module 126 and a genetic programming module 128.

At block 402, the initialization module 124 receives a set of semantic rules. As discussed above, the set of semantic rules can indicate how to structure text strings that represent the source code. In some embodiments, other representations such as abstract syntax trees, among others, may be used for convenience or efficiency instead of text strings. For example, a programming language may use a particular format for each operation. The set of semantic rules can include a set of formatting rules that indicate how to structure a text string for each operation of a programming language. In one example, the set of semantic rules may include formatting rules that indicate how to structure a text string for a loop function operation, a class function operation, or an arithmetic operation, among others.

At block 404, the initialization module 124 receives initialization values. As discussed above, the set of initialization values can include any suitable number of input values and output values. In some embodiments, the input values may indicate values that are provided to the source code and the output values may indicate values that are produced by the source code in response to the input values.

At block 406, the source code module 122 can determine if source code samples are received. In some embodiments, the source code samples may include any suitable number of source code samples in any number of programming languages. The source code module 122 can identify the operators and parameters used in each code fragment to determine the operators and parameters most likely to be used in the generated source code. In some embodiments, natural language processing techniques can be used to analyze source code samples. For example, functions may be used in place of numerical weights. The functions can return different values for weights depending on context. For example, the context may indicate that a particular variable has a high probability of following an operator in a line of source code. In some examples, the weight of the variable may be modified once the operator has been included in the line of source code. Therefore, the context of which terms are included in the source code can affect the weights of the weighted data structure. In some embodiments, the source code samples may also include sets of initialization values and weighted data structures. For example, each source code sample may include a corresponding set of initialization values and a corresponding weighted data structure. If source code samples are received, the process flow continues at block 408. If source code samples are not received, the process flow continues at block 410.

At block 408, the source code module 122 can compare sets of initialization values. For example, the source code module 122 can compare the set of initialization values received at block 404 with each set of initialization values associated with previous source code samples. In some examples, the source code module 122 can use natural language techniques to analyze the sets of initialization values. For example, the source code module 122 may use any suitable machine learning technique to interpret and compare the sets of initialization values.

Comparing the sets of initialization values can enable the source code module 122 to determine which source code samples to analyze and incorporate in the weighted data structure. For example, the source code module 122 may receive two sets of initialization values that are similar to the set of initialization values received at block 404. The source code module 122 may then incorporate the similar sets of initialization values into a weighted data structure. Comparing the sets of initialization values also allows the system to reject code fragments that are less likely to solve a problem. For example, initialization values that involve addition may trigger the analysis of code fragments that also involve addition, while code fragments that involve subtraction may not be incorporated into the weighted data structure.

At block 412, the source code module 122 can combine weighted data structures that correspond with source code samples. For example, each source code sample may include a corresponding weighted data structure. The source code module 122 can select any suitable number of weighted data structures that correspond with source code samples and the source code module 122 can combine the weighted data structures. For example, the source code module 122 may combine weighted data structures that are associated with similar sets of initialization values. In other embodiments, initialization parameters are generated without a weighted data structure. For example, the genetic programming module 128 may be used without the random code module 126. In one example, the initialization parameters, such as a crossover rate, mutation rate, or genome size, among others, may be generated by the genetic programming module 126 instead of the weighted data structure by combining the initialization parameters that correspond with source code samples. The genetic programming module 128 may then use the initialization parameters to generate source code.

At block 410, the source code module 122 can generate a weighted data structure. As discussed above, the weighted data structure can include any suitable data structure that can store weights for any number of entries. In some embodiments, the entries can include any number of operators and parameters. For example, a weighted data structure may include the operators recognized by a particular programming language. In some embodiments, the weights stored in the weighted data structure can indicate the likelihood of source code using a particular operator or parameter.

At block 414, source code is generated. In some embodiments, the random code module 126 can generate the source code. The random code module 126 may generate source code by randomly selecting operators from the weighted data structure based on the weights assigned to each operator. For example, a particular operator stored in the weighted data structure may have a greater likelihood of selection than other operators stored in the weighted data structure. In some embodiments, the random code module 126 can generate source code by using line by line generation (or block by block generation). The line by line generation allows the random code module 126 to identify a line of source code to include in the generated source code before attempting to identify a second line of source code. In some embodiments, the genetic programming module 128 can generate the source code. The genetic programming module 128 can use any number of genetic programming algorithms to generate source code.

At block 416, the source code module 122 can execute the source code. In some embodiments, the source code can produce an output value or a set of output values in response to input values from the set of initialization values. In some embodiments, a timeout value can be used to ensure the execution of the source code is terminated after a period of time. For example, the source code may include an infinite loop or a null-pointer assignment, among others, that can prevent the execution of the source code. A timeout value can indicate that the source code has not terminated after a period of time and execution of the source code can be stopped.

At block 418, the source code module 122 determines if the output values provided by the source code have an accuracy above a threshold. For example, the accuracy of generated source code may be determined by the number of output values produced that correspond with the expected output values provided in the set of initialization values. In some embodiments, the analysis of the source code may be determined with a generic cost function that takes into account any suitable metrics. In some embodiments, natural language techniques can be used to determine the accuracy of the source code. For example, a machine learning technique may be used to analyze the output from the source code and compare the output to the set of initialization values. If the accuracy of the generated source code is above a threshold, the process flow continues at block 420. If the accuracy of the generated source code is not above a threshold, the process flow continues at block 422.

At block 420, output is generated that includes the source code. For example, the generated source code may represent a function that can accept input values and generate output values that are included in the set of initialization values. In some examples, the generated source code may represent any suitable number of functions that can produce accurate output values. The process flow ends at block 424.

At block 422, the source code module 122 can update the weighted data structure based on statistical analysis, the output of a cost function, natural language analysis, or other suitable analysis techniques that can be used to predict the likelihood of words or programming constructs appearing given the current context. For example, the weight for a variable may be updated based on the number of times the variable appears in a particular context. In some examples, the context may include whether the variable is referenced as an argument to a function, whether the variable is a target of an assignment, or whether the variable is part of a function call. In some embodiments, the source code module 122 may find relationships between variables and modify the weights for the variables based on the relationship. For example, variables that are located close in proximity in the source code may have higher weights. In some embodiments, the source code module 122 can update the weighted data structure using any suitable statistical analysis technique. The process flow continues at block 414, where source code is generated based on the updated weighted data structure.

The process flow diagram of FIG. 4 is not intended to indicate that the operations of the method 400 are to be executed in any particular order, or that all of the operations of the method 400 are to be included in every case. Further, any number of additional operations may be included within the method 400, depending on the specific application. For example, NLP can be used to compare initialization values and select suitable source code samples from data storage. NLP can also be used to analyze the source code samples and generate N-grams, Markov chains, frequencies, weighted graphs, and other suitable constructs. In some embodiments, NLP can also be used to compare the output generated by the source code with the expected output. In addition, NLP can be used to analyze the output of the generated source code and update a weighted data structure to accelerate convergence. In some embodiments, NLP may be replaced with other techniques for predicting the likelihood of certain text appearing in a particular context. For example, the Bayes rule may be used to generate source code based on the source code generated so far.

Figure 5:
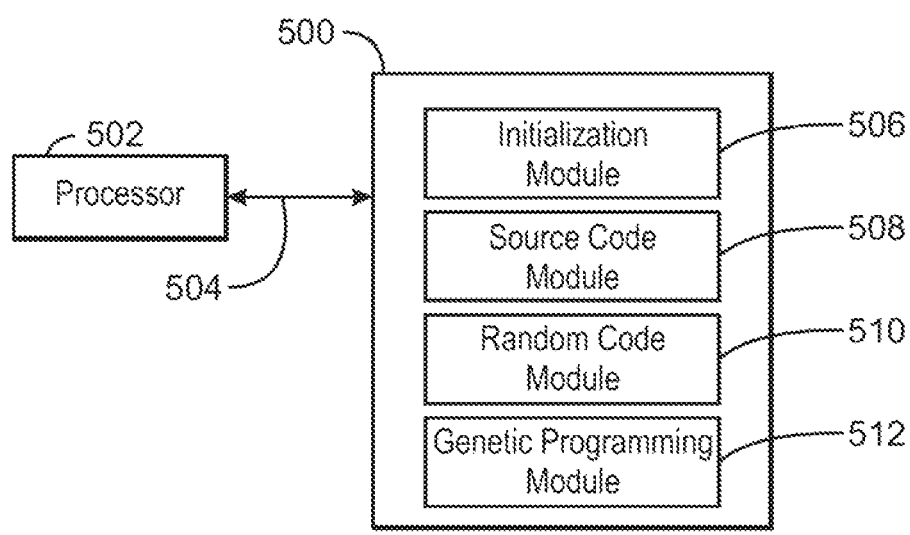
FIG. 5 is a block diagram depicting an example of a tangible, non-transitory computer-readable medium that can generate source code.

FIG. 5 is a block diagram of an example of a tangible, non-transitory computer readable medium that can generate source code. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an initialization module 506 may be adapted to direct the processor 502 to receive a set of initialization values. A source code module 508 may be adapted to direct the processor 502 to generate a weighted data structure. A random code module 510 may be adapted to direct the processor 502 to generate source code based on a weighted data structure. A genetic programming module 512 may also be adapted to direct the processor 502 to generate source code based on a weighted data structure. In some embodiments, the genetic programming module 512 may direct the processor 502 to use any suitable genetic programming technique to generate source code. It is to be understood that any number of additional software components not shown in FIG. 5 may be included within the tangible, non-transitory, computer-readable medium 500, depending on the specific application.

EXAMPLE 1

A method for generating source code is described herein. The method can include generating a weighted data structure and receiving a set of semantic rules for the source code. The method can also include generating the source code based on the weighted data structure and the set of semantic rules. Furthermore, the method can include receiving a set of initialization values, wherein the set of initialization values comprises a set of input values and a set of output values. In addition, the method can include determining the source code has an accuracy above a threshold based at least in part on the set of initialization values and an output value from the source code. The method can also include returning the source code based on the set of initialization values.

In some embodiments, the method for generating source code can modify the weighted data structure based on the statistical value. In some examples, the statistical value can be generated by a cost function. Additionally, the method can also generate the weighted data structure by analyzing previously executed source code samples using a natural language technique.

EXAMPLE 2

A computing device for generating source code is described herein. The computing device includes an input device that is adapted to receive a set of initialization values, a processor to execute stored instructions, and a storage device that stores computer-readable instructions. The computer-readable instructions can direct the processor to generate a weighted data structure and receive a set of semantic rules for the source code. The computer-readable instructions can also direct the processor to generate the source code based on the weighted data structure and the set of semantic rules. Furthermore, the computer-readable instructions can direct the processor to receive a set of initialization values, wherein the set of initialization values comprises a set of input values and a set of output values. In addition, the computer-readable instructions can direct the processor to determine the source code has an accuracy above a threshold based at least in part on the set of initialization values and an output value from the source code.

In some embodiments, the computing device may also direct the processor to return the source code based on the set of initialization values. Additionally, the computing device may also direct the processor to generate a weighted tree data structure for each previously executed source code, and combine the weighted tree data structures into the weighted data structure. In addition, the set of semantic rules used in part to generate the source code may include a set of syntax rules for a programming language.

EXAMPLE 3

At least one machine readable medium having instructions stored therein is described herein. In response to being executed on a computing device, the instructions cause the computing device to generate a weighted data structure and receive a set of semantic rules for the source code. The instructions can also cause the computing device to generate the source code based on the weighted data structure and the set of semantic rules. In addition, the instructions can cause the computing device to receive a set of initialization values, wherein the set of initialization values comprises a set of input values and a set of output values. Furthermore, the instructions can cause the computing device to determine the source code has an accuracy above a threshold based at least in part on the set of initialization values and an output value from the source code. The instructions can also cause the computing device to return the source code based on the set of initialization values.

In some embodiments, the instructions can also cause the computing device to execute the source code with the set of input values, detect the output of the source code, select a cost function to detect the accuracy of the source code, compute a statistical value with the cost function based at least in part on the output of the source code and the set of output values, and modify the weighted data structure based on the statistical value. The instructions can also cause the computing device to analyze the output value from the source code with a natural language technique. In addition, the instructions can cause the computing device to analyze the set of initialization values with a natural language technique to determine the accuracy of the source code.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method, executed by a processor, for generating source code comprising:
    generating a weighted data structure by combining similar source code samples identified using natural language processing;
    generating a set of semantic rules for the source code by performing semantic natural language process analysis on the similar previously identified source code samples, the set of semantic rules indicating programming language syntax rules for the source code being generated;
    generating the source code based on the weighted data structure and the set of semantic rules;
    receiving a set of initialization values, wherein the set of initialization values comprises a set of input values and a set of output values;
    executing the source code with the set of input values;
    detecting an output of the source code;
    selecting a cost function to detect an accuracy of the source code;
    calculating a statistical value with the cost function based at least in part on the output of the source code and the set of output values;
    determining the accuracy of the source code is above a threshold based at least in part on the set of initialization values, the statistical value, and an output value from the source code, the accuracy indicating that the output value corresponds to an expected value in the set of initialization values; and returning the source code based on the set of initialization values in response to determining that the accuracy of the source code is above the threshold.

2. The method of claim 1 comprising modifying the weighted data structure based on the statistical value.

3. The method of claim 1, wherein the set of semantic rules comprises a set of syntax rules for a programming language.

4. The method of claim 1, wherein generating the weighted data structure comprises analyzing the previously executed source code using a natural language technique.

5. The method of claim 4, wherein generating the weighted data structure comprises:
generating a weighted tree data structure for the previously executed source code; and
combining the weighted tree data structures into the weighted data structure.

6. The method of claim 1, wherein determining the source code has an accuracy above a threshold based at least in part on the set of initialization values and an output value from the source code comprises analyzing the set of initialization values with a natural language technique.

7. The method of claim 1, wherein determining the source code has an accuracy above a threshold based at least in part on the set of initialization values and an output value from the source code comprises analyzing the output value from the source code with a natural language technique.

8. A computing device for generating source code comprising:
an input device that is adapted to receive a set of initialization values;
a processor to execute stored instructions; and
a storage device that stores computer-readable instructions that, when executed by the processor, direct the processor to:
generate a weighted data structure by combining similar source code samples identified using natural language processing;
generate a set of semantic rules for the source code by performing semantic natural language process analysis on the similar previously identified source code samples, the set of semantic rules to indicate programming language syntax rules for the source code to be generated;
generate the source code based on the weighted data structure and the set of semantic rules;
receive a set of initialization values, wherein the set of initialization values comprises a set of input values and a set of output values;
execute the source code with the set of input values;
detect an output of the source code;
select a cost function to detect an accuracy of the source code;
calculate a statistical value with the cost function based at least in part on the output of the source code and the set of output values;
determine the accuracy of the source code is above a threshold based at least in part on the set of initialization values, the statistical value, and an output value from the source code, the accuracy indicating that the output value corresponds to an expected value in the set of initialization values; and
return the source code in response to determining that the accuracy of the source code is above the threshold.

9. The computing device of claim 8, wherein the computer-readable instructions direct the processor to return the source code based on the set of initialization values.

10. The computing device of claim 8, wherein the computer-readable instructions direct the processor to modify the weighted data structure based on the statistical value.

11. The computing device of claim 8, wherein the computer-readable instructions direct the processor to use a natural language processing technique to modify the weighted data structure.

12. The computing device of claim 8, wherein the set of semantic rules comprises a set of syntax rules for a programming language.

13. The computing device of claim 8, wherein the computer-readable instructions direct the processor to analyze the previously executed source code.

14. The computing device of claim 13, wherein the computer-readable instructions direct the processor to
generate a weighted tree data structure for the previously executed source code; and
combine the weighted tree data structures into the weighted data structure.

15. The computing device of claim 8, wherein the computer-readable instructions direct the processor to analyze the set of initialization values with a natural language technique to determine the accuracy of the source code.

16. A non-transitory, computer-readable medium comprising a plurality of instructions that, in response to being executed on a computing device, cause the computing device to:
generate a weighted data structure by combining similar source code samples identified using natural language processing;
generate a set of semantic rules for the source code by performing semantic natural language process analysis on the similar previously identified source code samples, the set of semantic rules to indicate programming language syntax rules for the source code to be generated;
generate the source code based on the weighted data structure and the set of semantic rules;
receive a set of initialization values, wherein the set of initialization values comprises a set of input values and a set of output values;
execute the source code with the set of input values;
detect an output of the source code;
select a cost function to detect an accuracy of the source code;
calculate a statistical value with the cost function based at least in part on the output of the source code and the set of output values;
determine the accuracy of the source code is above a threshold based at least in part on the set of initialization values, the statistical value, and an output value from the source code, the accuracy indicating that the output value corresponds to an expected value in the set of initialization values; and
return the source code based on the set of initialization values, in response to determining that the accuracy of the source code is above the threshold.

17. The non-transitory machine readable medium of claim 16, wherein the instructions further cause the computing device to:
modify the weighted data structure based on the statistical value.

18. The non-transitory machine readable medium of claim 17, wherein the instructions further cause the computing device to analyze the previously executed source code.

19. The non-transitory machine readable medium of claim 18, wherein the instructions further cause the computing device to
- generate a weighted tree data structure for the previously executed source code; and
- combine the weighted tree data structures into the weighted data structure.

20. The non-transitory machine readable medium of claim 16, wherein the instructions further cause the computing device to analyze the set of initialization values with a natural language technique to determine the accuracy of the source code.

21. The non-transitory machine readable medium of claim 16, wherein the instructions further cause the computing device to analyze the output value from the source code with a natural language technique to determine the accuracy of the source code.

22. The method of claim 1, comprising updating the weighted data structure based in part on a construct generated from the output value from the source code.

* * * * *